United States Patent
Natanzon et al.

(10) Patent No.: US 9,507,732 B1
(45) Date of Patent: Nov. 29, 2016

(54) SYSTEM AND METHOD FOR CACHE MANAGEMENT

(71) Applicant: EMC Corporation, Hopkinton, MA (US)

(72) Inventors: Assaf Natanzon, Tel Aviv (IL); Philip Derbeko, Modiin (IL); Anat Eyal, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 190 days.

(21) Appl. No.: 13/630,746

(22) Filed: Sep. 28, 2012

(51) Int. Cl.
  *G06F 12/12* (2016.01)
  *G06F 12/08* (2016.01)

(52) U.S. Cl.
  CPC ........... *G06F 12/12* (2013.01); *G06F 12/0815* (2013.01); *G06F 12/0806* (2013.01)

(58) Field of Classification Search
  CPC . G06F 12/12; G06F 12/0804; G06F 12/0806
  USPC .................................................. 711/1–200
  See application file for complete search history.

(56) References Cited

U.S. PATENT DOCUMENTS

| | | | |
|---|---|---|---|
| 2002/0116583 A1* | 8/2002 | Copeland | G06F 17/30902 711/133 |
| 2008/0127182 A1* | 5/2008 | Newport et al. | 718/1 |
| 2010/0211829 A1* | 8/2010 | Ziskind | G06F 11/0757 714/48 |
| 2010/0223274 A1* | 9/2010 | DeHaan | G06F 17/30144 707/758 |
| 2010/0228913 A1* | 9/2010 | Czezatke | G06F 11/1451 711/112 |
| 2012/0054367 A1* | 3/2012 | Ramakrishnan | G06F 9/4856 709/242 |
| 2012/0239860 A1* | 9/2012 | Atkisson et al. | 711/103 |

* cited by examiner

*Primary Examiner* — David X Yi
*Assistant Examiner* — Zubair Ahmed
(74) *Attorney, Agent, or Firm* — Brian J. Colandreo; Mark H. Whittenberger; Holland & Knight LLP

(57) ABSTRACT

A method, computer program product, and computing system for associating a tracking file with a multi-portion data file located on a data array. The tracking file is configured to monitor the status of each portion of the multi-portion data file. At least one portion of the multi-portion data file is modified via a virtual machine executed on a first physical machine. The tracking file is updated to reflect the modification of the at least one portion of the multi-portion data file.

18 Claims, 6 Drawing Sheets

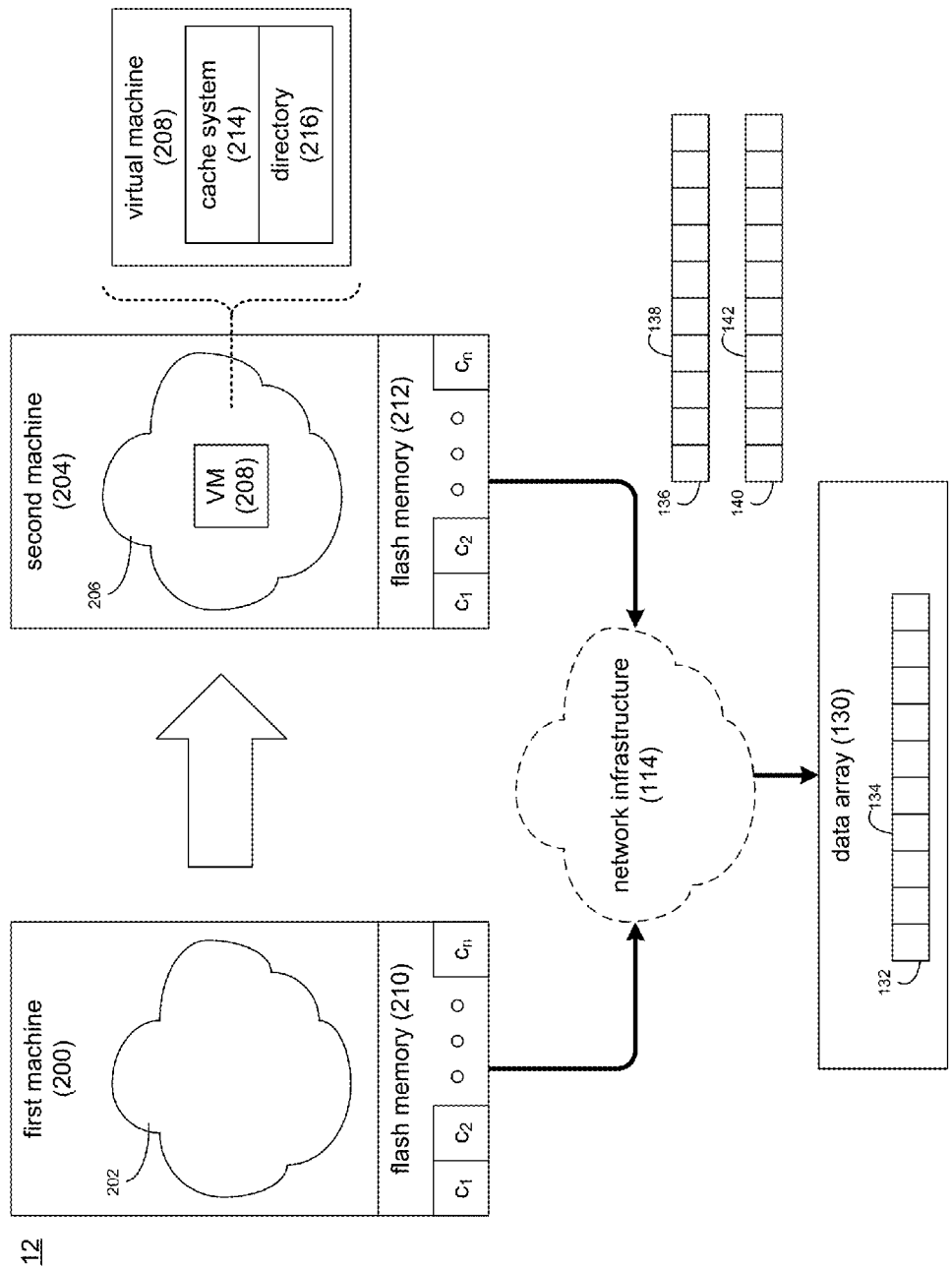

SYSTEM AND METHOD FOR CACHE MANAGEMENT

TECHNICAL FIELD

This disclosure relates to cache memory systems and, more particularly, to systems and methods for improving the performance of cache memory systems.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes associating a tracking file with a multi-portion data file located on a data array. The tracking file is configured to monitor the status of each portion of the multi-portion data file. At least one portion of the multi-portion data file is modified via a virtual machine executed on a first physical machine. The tracking file is updated to reflect the modification of the at least one portion of the multi-portion data file.

One or more of the following features may be included. The virtual machine may be migrated from the first physical machine to a second physical machine. A cache system associated with the second physical machine may be updated based, at least in part, upon the tracking file. Updating a cache associated with the second physical machine may include invalidating one or more portions of the cache system. The tracking file may be stored on the data array. The tracking file may be locally cached on the first physical machine. The data array may include a non-volatile, electro-mechanical memory system.

In another implementation, a computer program product resides on a computer readable medium that has a plurality of instructions stored on it. When executed by a processor, the instructions cause the processor to perform operations including associating a tracking file with a multi-portion data file located on a data array. The tracking file is configured to monitor the status of each portion of the multi-portion data file. At least one portion of the multi-portion data file is modified via a virtual machine executed on a first physical machine. The tracking file is updated to reflect the modification of the at least one portion of the multi-portion data file.

One or more of the following features may be included. The virtual machine may be migrated from the first physical machine to a second physical machine. A cache system associated with the second physical machine may be updated based, at least in part, upon the tracking file. Updating a cache associated with the second physical machine may include invalidating one or more portions of the cache system. The tracking file may be stored on the data array. The tracking file may be locally cached on the first physical machine. The data array may include a non-volatile, electro-mechanical memory system.

In another implementation, a computing system includes at least one processor and at least one memory architecture coupled with the at least one processor, wherein the computing system is configured to perform operations including associating a tracking file with a multi-portion data file located on a data array. The tracking file is configured to monitor the status of each portion of the multi-portion data file. At least one portion of the multi-portion data file is modified via a virtual machine executed on a first physical machine. The tracking file is updated to reflect the modification of the at least one portion of the multi-portion data file.

One or more of the following features may be included. The virtual machine may be migrated from the first physical machine to a second physical machine. A cache system associated with the second physical machine may be updated based, at least in part, upon the tracking file. Updating a cache associated with the second physical machine may include invalidating one or more portions of the cache system. The tracking file may be stored on the data array. The tracking file may be locally cached on the first physical machine. The data array may include a non-volatile, electro-mechanical memory system.

The details of one or more implementations are set forth in the accompanying drawings and the description below. Other features and advantages will become apparent from the description, the drawings, and the claims.

BRIEF DESCRIPTION OF THE DRAWINGS

FIG. 3B is a diagrammatic view of an embodiment of the storage system of FIG. 1;

Like reference symbols in the various drawings indicate like elements.

DETAILED DESCRIPTION OF THE PREFERRED EMBODIMENTS

Figure 1:
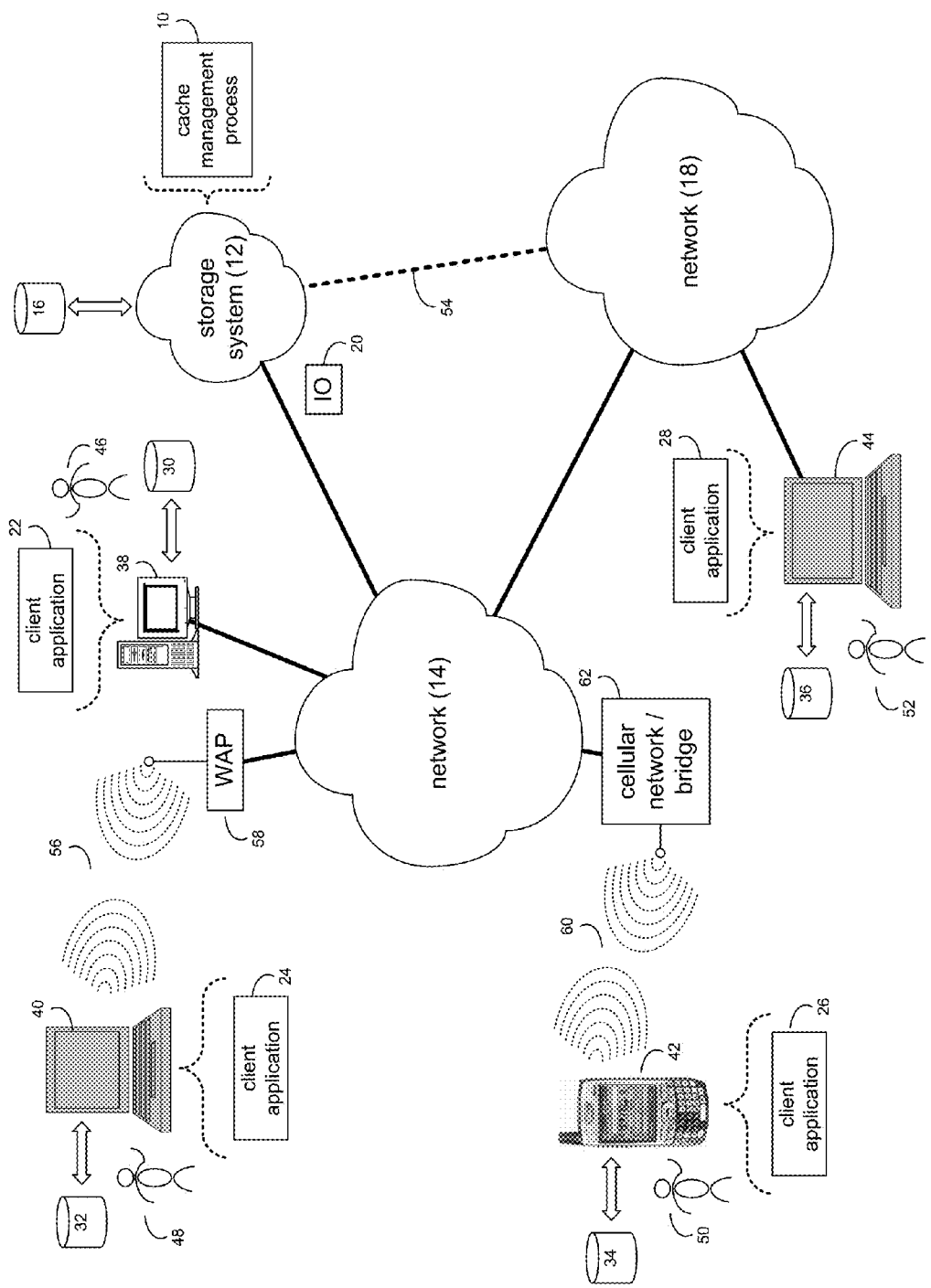
FIG. 1 is a diagrammatic view of a storage system and a cache management process coupled to a distributed computing network.

System Overview:

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

The Cache Management Process:

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
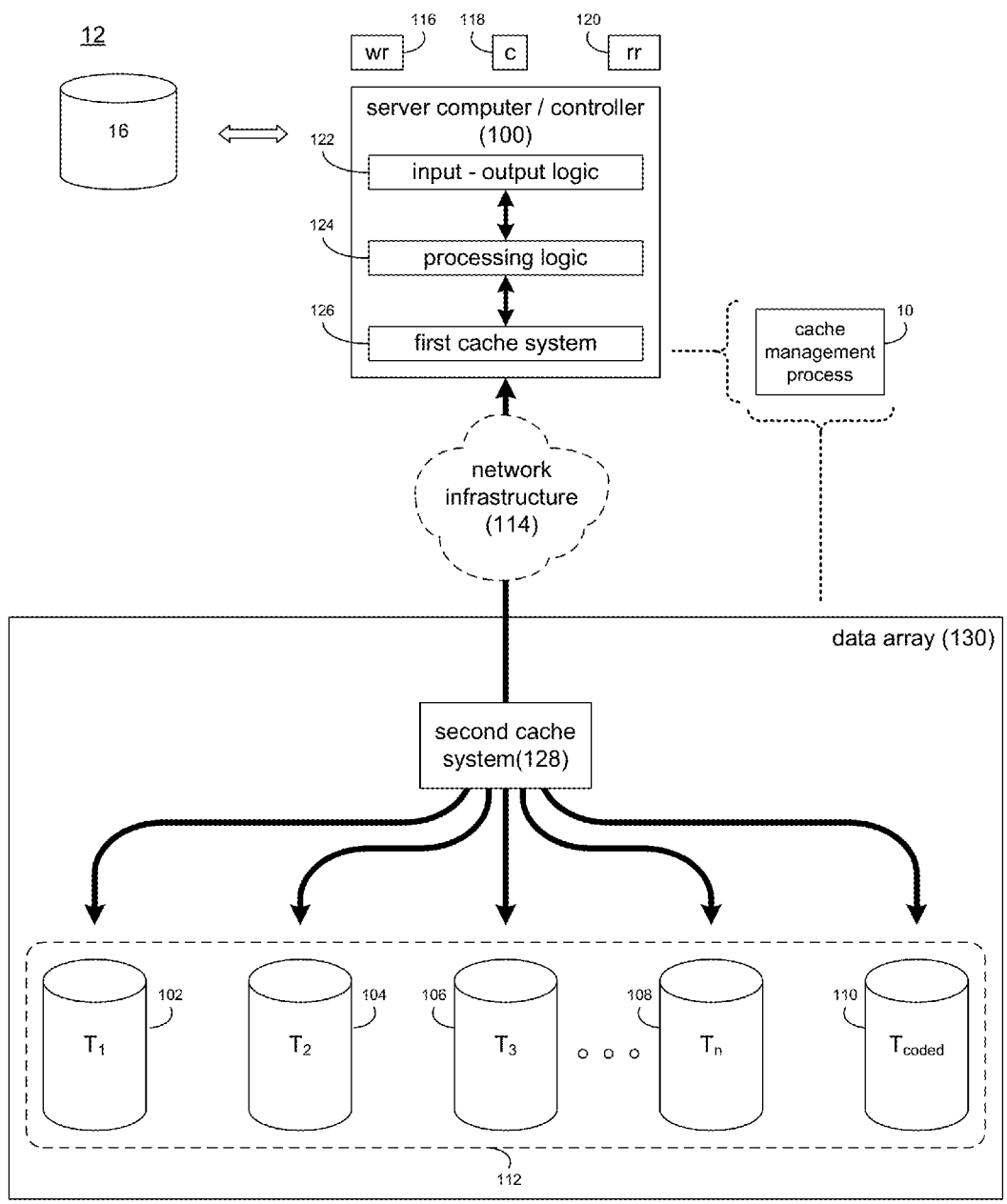
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or a NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of cache management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of cache management process 10 may be executed by one or more processors (not shown) and one or more memory architectures (not shown) included within data array 130.

Figure 3A:
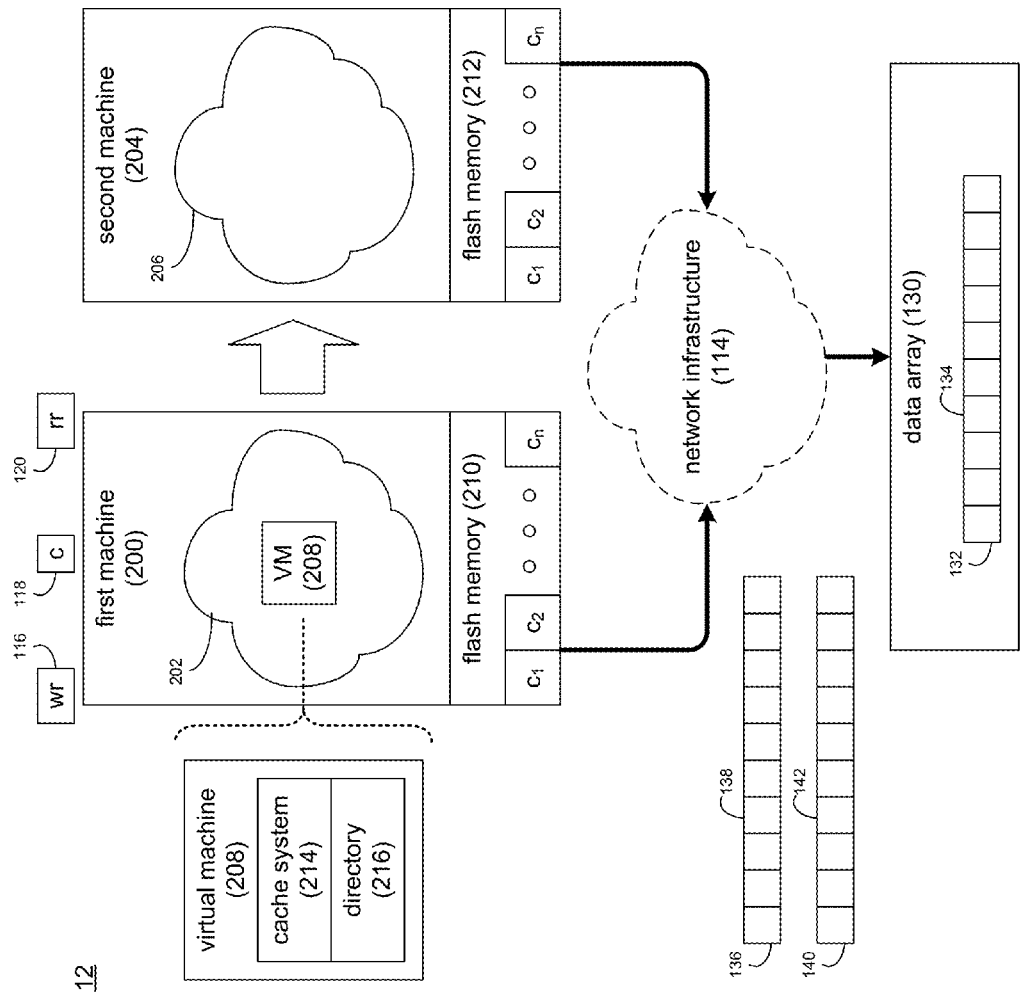
FIG. 3A is a diagrammatic view of an embodiment of the storage system of FIG. 1.

Referring also to FIGS. 3A-3B, assume for the following example that first server computer/controller 200 is a physical device that is executing first virtual machine operating environment 202. An example of such a virtual machine operating environment is a hypervisor, which is an instantiation of an operating system that allows for multiple virtual machines to operate within a single physical device (e.g., first server computer/controller 200). Further, second server computer/controller 204 is a physical device that is executing second virtual machine operating environment 206 (e.g., a hypervisor).

For this example, further assume that first virtual machine operating environment 202 within first server computer/controller 200 is executing a virtual machine (e.g., virtual machine 208). While first virtual machine operating environment 202 is shown to be executing only a single virtual machine, this is for illustrative purposes only and is not intended to be a limitation of this disclosure, as the number of virtual machines executed within first virtual machine operating environment 202 may increase/decrease depending upon need/loading.

Assume further that first server computer/controller 200 and second server computer/controller 204 each includes a non-volatile memory system (e.g., flash memory devices 210, 212, respectively) that first server computer/controller 200 and second server computer/controller 204 may use for cache storage. Each of flash memory devices 210, 212 may be compartmentalized (e.g., into "n" portions, wherein a unique portion of flash memory device 210 may be assigned to each virtual machine running on first virtual machine operating environment 202 and a unique portion of flash memory device 212 may be assigned to each virtual machine running on second virtual machine operating environment 206.

Virtual machine 208 may be associated with cache system 214, which may include content directory 216. Accordingly, virtual machine 208 may use cache system 214, which may be implemented using flash memory device 210. Content directory 216 may be configured to identify the location of specific pieces of content included within (in this example) flash memory device 210 and their corresponding pieces of data within data array 130.

Assume for illustrative purposes that data file 132 is stored within data array 130. Further assume that data file 132 is a larger data file, examples of which may include larger database files.

Accordingly, in the event that a read request (e.g., read request 120) is received on a host (e.g., server computer/controller 200) concerning data file 130, it may be impractical (e.g., from a performance perspective and/or from a capacity perspective) to cache the entirety of data file 132 within the cache system (e.g., cache system 214) of the host (e.g., server computer/controller 200). Accordingly, data file 132 may be configured as a multi-portion data file in which only the portion of the data file requested by a specific host (e.g., server computer/controller 200) is cached within the cache system (e.g., cache system 214) of the host (e.g., server computer/controller 200) upon the processing of read request 120).

For example and concerning read requests, assume that read request 120, which is processed by server computer/controller 200, requests a specific one megabyte portion of data file 132 (e.g., portion 134). Accordingly, the host (e.g., server computer/controller 200) may retrieve from data array 130 only portion 134 of data file 132, which may be stored within the cache system (e.g., cache system 214) of the host (e.g., server computer/controller 200) and provided to the entity requesting portion 134 of data file 132.

Further, write requests (e.g., write request 116) received on a host (e.g., server computer/controller 200) concerning data file 132 may be configured so that the data (e.g., content 118) associated with the write request (e.g., write request 116) only represents a specific portion (e.g., portion 134) of data file 132 that is to be written to data array 130.

For example and concerning write requests, assume that write request 116, which is processed by server computer/controller 200, requests that a one megabyte portion of data file 132 (e.g., content 118) be written to data array 130. Accordingly, the host (e.g., server computer/controller 200) may receive content 118, which may be stored within the cache system (e.g., cache system 214) of the host (e.g., server computer/controller 200) and provided to data array 130 for storage as e.g., portion 134 of data file 132.

Figure 4:
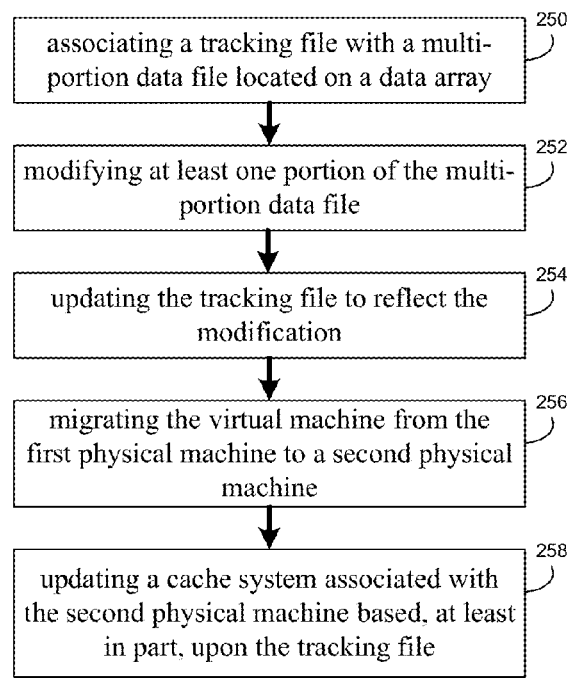
FIG. 4 is a flow chart of one implementation of the cache management process of FIG. 1.

Referring also to FIG. 4, cache management process 10 may associate 250 a tracking file (e.g., tracking file 136) with data file 132. Tracking file 136 may be stored on data array 130. Additionally/alternatively, tracking file 136 may be locally cached on the physical machine processing the write request (e.g., server computer/controller 200), wherein the locally cached copy of tracking file 136 may be modified and then (once the modification is complete) the modified copy of tracking file 136 may be provided to data array 130 so that it may overwrite the original (i.e., unmodified) version of tracking file 136 included within data array 130.

Tracking file 136 may be configured to indicate the status of each portion of data file 132. Specifically, tracking file 136 may be configured so that tracking file 136 indicates if changes were made to a specific portion of data file 132 (e.g., due to the processing of write request 116) and the identity of the host (e.g., server computer/controller 200) that made those changes. For example, assume for illustrative purposes that data file 132 is divided into ten portions. Accordingly, tracking file 136 may be configured to include ten 8-bit indicators, wherein a unique 8-bit indicator is assigned to each of the ten portions of data file 132. In the event that a change is made to one of the ten portions of data file 132, the unique 8-bit indicator that is assigned to the changed portion of data file 132 may be updated to indicate the identity of the host (e.g., first machine 200) that made the change. As, in this example, the indicators are eight bits in length, two-hundred-fifty-six unique hosts may be identified within each unique 8-bit indicator.

Continuing with the above-stated example, assume that server computer/controller 200 processes write request 116. Accordingly, cache management process 10 may modify 252 the appropriate portion of data file 132. For example, cache management process 10 may overwrite portion 134 of data file 132 to include content 118 defined within write request 116. As, in this example, server computer/controller 200 is executing first virtual machine operating environment 202 (which is executing virtual machine 208), virtual machine 208 may modify 252 the appropriate portion of data file 132.

Further, cache management process 10 may update 254 tracking file 136 to reflect the modification of the appropriate portion of data file 132. For example, cache management process 10 may update 254 unique 8-bit indicator 138 (that is associated with portion 134 of data file 132) to indicate that portion 134 of data file 132 was modified by (in this example) server computer/controller 200.

Assume that for some reason (e.g., maintenance/load balancing), cache management process 10 receives an indication, on virtual machine 208, that virtual machine 208 is going to be migrated. Specifically, through the use of products like VMware, virtual machines may be migrated (from a first physical device to a second physical device) without being shut down (which is commonly referred to as a live migration or vmotion).

Assume for illustrative purposes that the above-described indication concerns virtual machine 208 being migrated from first virtual machine operating environment 202 running on first server computer/controller 200 to second virtual machine operating environment 206 running on second server computer/controller 204. Specifically, FIG. 3A is intended to illustrate the system prior to the migration of virtual machine 208 to second virtual machine operating environment 206 and FIG. 3B is intended to illustrate the system subsequent to the migration of virtual machine 208 to second virtual machine operating environment 206. One or more of the above-described virtual machine operating environments (e.g., first virtual machine operating environment 202 and/or second virtual machine operating environment 206) may use one or more plug-ins/applets within the management framework of the virtual machine operating environment to allow for processing of the above-described indication notification and to effectuate the above-described migration.

Cache management process 10 may migrate 256 the virtual machine (e.g., virtual machine 208) from the first physical machine (e.g., first server computer/controller 200) to a second physical machine (e.g., second server computer/controller 204).

Assume for illustrative purposes that cache management process 10 repeatedly migrates 256 virtual machine 208 between first server computer/controller 200 and second server computer/controller 204 (e.g., for load balancing purposes). When the migration 256 of virtual machine 208 from a first physical device to a second physical device is completed, some of the data included within the cache associated with the virtual machine may still be usable by virtual machine 208. For example, if virtual machine 208 is migrated 256 from first server computer/controller 200 to second server computer/controller 204; and then subsequently migrated 256 from second server computer/controller 204 back to first server computer/controller 200, any cache data that was included within the cache (e.g., cache system 214) associated with virtual machine 208 executing on first server computer/controller 200 is still usable (and therefore valid) if the corresponding data located on data array 130 was not modified during the time that virtual machine 208 was being executed on second server computer/controller 204. Such a determination concerning whether the cache data was modified while the virtual machine was being executed by another server computer/controller may be made by processing above-described tracking file 136 (which may be locked by the "active" physical device and unlocked once virtual machine 208 is moved to another physical device).

Accordingly and continuing with the above-stated example, once virtual machine 208 is migrated 256 from first server computer/controller 200 to second server computer/controller 204, cache management process 10 may update 258 the cache system (e.g., cache system 214) associated with second server computer/controller 204 based, at least in part, upon tracking file 136. When updating 258 the cache system (e.g., cache system 214) associated with second server computer/controller 204, cache management process 10 may invalidate one or more portions of cache system 214.

Continuing with the above-described example in which cache management process 10 repeatedly migrates 256 virtual machine 208 between server computers/controllers 200, 204, once virtual machine 208 is migrated from first server computer/controller 200 back to second server computer/controller 204, virtual machine 208 is faced with the situation in which the portion of flash memory 212 that is used for storage by cache system 214 is filed with cached data that virtual machine 208 is not sure corresponds to data stored within data array 130.

For example, assume that virtual machine 208 (while resident on second server computer/controller 204) processed a write request (e.g., write request 116) and wrote the related data (e.g., content 118) to cache system 214 (and therefore flash memory 212) and also to data array 130. Further assume that virtual machine 208 was then migrated 256 to first server computer/controller 200 and subsequently migrated 256 back to second server computer/controller 204.

The data (e.g., content 118) that was previously written to cache system 214 (and therefore flash memory 212) would still be valid (i.e., correspond to the data stored within data array 130) if the data stored within data array 130 was not overwritten by virtual machine 208 when virtual machine 208 was resident on first server computer/controller 200. Accordingly and as discussed above, cache management process 10 may update 258 the cache system (e.g., cache system 214) associated with (in this example) second server computer/controller 204 based, at least in part, upon tracking file 136.

Specifically, cache management process 10 may process tracking file 136 to determine which portions of data file 136 were last modified by (in this example) a host other than second server computer/controller 204. Once such portions are identified within data file 136, any cache entries within cache system 214 that correspond to such identified portions of data file 136 may be invalidated. Specifically, if second server computer/controller 204 was not the last host to write data to a specific portion of data array 130, the corresponding cache entry within cache system 214 may no longer match the data within data array 130. Accordingly, such cache entries would be invalidated by cache management system 10 when updating 258 the cache system (e.g., cache system 214) associated with (in this example) second server computer/controller 204.

Figure 5:
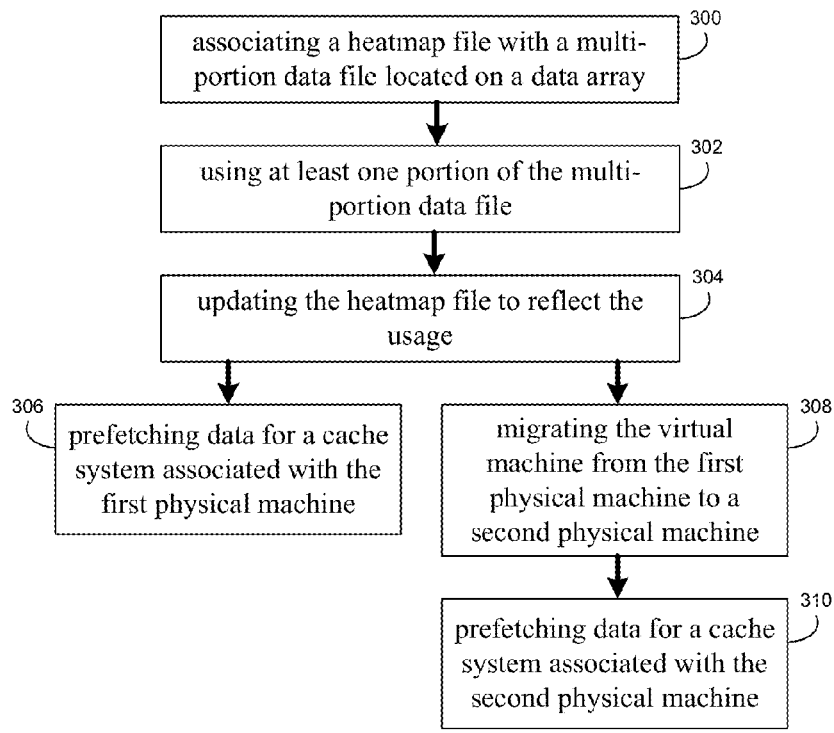
FIG. 5 is a flow chart of another implementation of the cache management process of FIG. 1.

Referring also to FIG. 5, while cache management process 10 may associate 250 a tracking file (e.g., tracking file 136) with data file 132, wherein tracking file 136 may be configured to monitor the status of each portion of data file 132 (e.g., to indicate if changes were made to a specific portion of data file 132 and the identity of the host that made those changes), other types of files may be associated with data file 132. For example, cache management process 10 may additionally/alternatively associate 300 a heatmap file (e.g., heatmap file 140) with data file 132, wherein heatmap file 140 is configured to monitor the usage of each portion of data file 132.

Specifically, heatmap file 140 may be configured so that heatmap file 140 indicates the level of usage of a specific portion of data file 132 (e.g., due to the processing of write request 116 and/or read requests 120). Again, assume for illustrative purposes that data file 132 is divided into ten portions. Accordingly, heatmap file 140 may be configured to include ten 8-bit indicators, wherein a unique 8-bit indicator is assigned to each of the ten portions of data file 132. Assume that each time a portion of data file 132 is written to and/or read from, the unique 8-bit indicator that is assigned to the written to/read from portion of data file 132 may be incremented to indicate usage of that particular portion of data file 132. As, in this example, the indicators are eight bits in length, two-hundred-fifty-six uses of a particular portion of data file 132 may be notated. Naturally, the bit size of the unique indicators may be increased (e.g., to 16 or 32 bits) and/or the granularity of each bit increment may be changed (e.g., a one bit increment equates to ten usage incidents, as opposed to one usage incident) to increase usage monitoring capacity.

Heatmap file 140 may be stored on data array 130. Additionally/alternatively, heatmap file 140 may be locally cached on the physical machine processing the write request and/or the read request (e.g., server computer/controller 200), wherein the locally cached copy of heatmap file 140 may be modified and then (once the modification is complete) the modified copy of heatmap file 140 may be provided to data array 130 so that it may overwrite the original (i.e., unmodified) version of heatmap file 140 included within data array 130.

Assume for illustrative purposes that server computer/controller 200 processes write request 116 and/or read request 120. Accordingly, cache management process 10 may use 302 a portion (e.g., portion 134) of data file 132. Usage of portion 134 of data file 132 may be in the form of writing to portion 134 (in the event that cache management process 10 processes write request 116) or in the form of reading from portion 134 (in the event that cache management process 10 processes read request 120). Since, in this example, server computer/controller 200 is executing first virtual machine operating environment 202 (which is executing virtual machine 208), virtual machine 208 may use 302 various portions of data file 132. Further, cache management process 10 may update 304 the appropriate portion(s) (e.g., portion 142) of heatmap file 140 to reflect the usage of e.g., portion 134 of data file 132. Updating 304 may occur in the manner described above (e.g., incrementing a counter).

Cache management process 10 may prefetch 306 data for a cache system (e.g., cache system 214) associated with first physical machine 200 based, at least in part, upon heatmap file 140. Heatmap file 140 may or may not have temporal aspects associated with it. For example, heatmap files may be generated at various times during the day, week, month or year. Specifically, a group of files that are hotly used at the end of the month (when payroll is being processed) may be essentially not used during the remainder of the month. Additionally/alternatively, the temporal aspect may be indicative of a data sequence. For example, cache management process 10 may prefetch 306 data group "B" knowing that data group "B" is routinely accessed after data group "A" (which is currently being processed). Accordingly, by generating heatmap files that have the appropriate temporal aspects, cache system 214 (in this example) may be smartly populated by prefetching data from data array 130 in anticipation of e.g., the use of payroll files at the end of a month or the next group of data files. Therefore, cache management process 10 may be configured to process the appropriate heatmap file (e.g., heatmap file 140) and may prefetch 306, from data array 130, data that cache management process 10 predicts will be requested in the future.

Assume for illustrative purposes that it is the end of the third week of a month. Accordingly, cache management process 10 may obtain the heatmap file associated with the fourth week of the month to determine what files are likely to be requested during that week. Assume that heatmap file 140 indicates that ten specific payroll files (included within portion 134 of data file 132) are highly utilized during the last week of the month. Accordingly, cache management process 10 may prefetch 306 portion 134 of data file 132 and cache portion 134 within cache system 214. Therefore, if a read request is received for portion 134 of data file 132, portion 134 will not need to be first retrieved from data array 130 and will be readily available via cache system 214.

Additionally/alternatively, the above-described system may be utilized when migrating virtual machines. For example, cache management process 10 may migrate 308 e.g., virtual machine 208 from e.g., first server computer/controller 200 to second server computer/controller 204 (in the manner described above). Once virtual machine 208 is migrated 308, cache management process 10 may prefetch 310 data for cache system 214 associated with second server computer/controller 204 based, at least in part, upon heatmap file 140.

Specifically, cache management process 10 may be configured to process the appropriate heatmap file (e.g., heatmap file 140) and may prefetch 310, from data array 130, data that cache management process 10 predicts will be requested in the future. Again, assuming for illustrative purposes that it is the end of the third week of a month, cache management process 10 may obtain the heatmap file associated with the fourth week of the month to determine what files are likely to be requested during that week. As discussed above, if heatmap file 140 indicates that ten specific payroll files (included within portion 134 of data file 132) are highly utilized during the last week of the month, cache management process 10 may prefetch 310 portion 134 of data file 132 and cache portion 134 within cache system 214.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    associating a tracking file with a multi-portion data file, wherein the multi-portion data file is a single data file with multiple portions located on a data array, wherein the tracking file is configured to monitor the status of each portion of the multi-portion data file;
    modifying at least one portion of the multi-portion data file via a first virtual machine executed on a first physical machine of a plurality of physical machines;
    updating the tracking file to reflect the modification of the at least one portion of the multi-portion data file, wherein the tracking file includes which physical machine of the plurality of physical machines modified each portion of the multi-portion data file, and further includes an indication whether cache data associated with the first virtual machine was modified while the first virtual machine was migrated and executed on a second physical machine of the plurality of physical machines;
    migrating the first virtual machine from the first physical machine to the second physical machine, and migrating the first virtual machine from the second physical machine back to the first physical machine; and
    determining if at least one portion of the multi-portion data file is valid for the first physical machine, wherein the at least one portion of the multi-portion data file is valid for the first physical machine if the at least one portion of the multi-portion data file was not modified by a host other than the first physical machine indicated by the tracking file.

2. The computer-implemented method of claim 1 further comprising:
    updating a cache system associated with the second physical machine based, at least in part, upon the tracking file.

3. The computer-implemented method of claim 2 wherein updating a cache associated with the second physical machine includes:
    invalidating one or more portions of the cache system.

4. The computer-implemented method of claim 1 wherein the tracking file is stored on the data array.

5. The computer-implemented method of claim 1 wherein the tracking file is locally cached on the first physical machine.

6. The computer-implemented method of claim 1 wherein the data array includes a non-volatile, electro-mechanical memory system.

7. A computer program product residing on a non-transitory computer readable medium having a plurality of instructions stored thereon which, when executed by a processor, cause the processor to perform operations comprising:

associating a tracking file with a multi-portion data file, wherein the multi-portion data file is a single data file with multiple portions located on a data array, wherein the tracking file is configured to monitor the status of each portion of the multi-portion data file;

modifying at least one portion of the multi-portion data file via a first virtual machine executed on a first physical machine of a plurality of physical machines;

updating the tracking the to reflect the modification of the at least one portion of the multi-portion data file, wherein the tracking file includes which physical machine of the plurality of physical machines modified each portion of the multi-portion data file, and further includes an indication whether cache data associated with the first virtual machine was modified while the first virtual machine was migrated and executed on a second physical machine of the plurality of physical machines;

migrating the first virtual machine from the first physical machine to the second physical machine, and migrating the first virtual machine from the second physical machine back to the first physical machine; and determining if at least one portion of the multi-portion data file is valid for the first physical machine, wherein the at least one portion of the multi-portion data file is valid for the first physical machine if the at least one portion of the multi-portion data file was not modified by a host other than the first physical machine indicated by the tracking file.

8. The computer program product of claim 7 further comprising instructions for:

updating a cache system associated with the second physical machine based, at least in part, upon the tracking file.

9. The computer program product of claim 8 wherein the instructions for updating a cache associated with the second physical machine include instructions for:

invalidating one or more portions of the cache system.

10. The computer program product of claim 7 wherein the tracking file is stored on the data array.

11. The computer program product of claim 7 wherein the tracking file is locally cached on the first physical machine.

12. The computer program product of claim 7 wherein the data array includes a non-volatile, electro-mechanical memory system.

13. A computing system comprising:
at least one processor device; and
at least one memory architecture coupled with the at least one processor device;
wherein the at least one processor device is further configured to perform operations comprising;

associating a tracking file with a multi-portion data file, wherein the multi-portion data file is a single data file with multiple portions located on a data array, wherein the tracking file is configured to monitor the status of each portion of the multi-portion data file;

modifying at least one portion of the multi-portion data file via a first virtual machine executed on a first physical machine of a plurality of physical machines;

updating the tracking file to reflect the modification of the at least one portion of the multi-portion data file, wherein the tracking file includes which physical machine of the plurality of physical machines modified each portion of the multi-portion data file, and further includes an indication whether cache data associated with the first virtual machine was modified while the first virtual machine was migrated and executed on a second physical machine of the plurality of physical machines;

migrating the first virtual machine from the first physical machine to the second physical machine, and migrating the first virtual machine from the second physical machine back to the first physical machine; and determining if at least one portion of the multi-portion data file is valid for the first physical machine, wherein the at least one portion of the multi-portion data file is valid for the first physical machine if the at least one portion of the multi-portion data file was not modified by a host other than the first physical machine indicated by the tracking file.

14. The computing system of claim 13 further configured to perform operations comprising:

updating a cache system associated with the second physical machine based, at least in part, upon the tracking file.

15. The computing system of claim 14 wherein updating a cache associated with the second physical machine includes:

invalidating one or more portions of the cache system.

16. The computing system of claim 13 wherein the tracking file is stored on the data array.

17. The computing system of claim 13 wherein the tracking file is locally cached on the first physical machine.

18. The computing system of claim 13 wherein the data array includes a non-volatile, electro-mechanical memory system.

\* \* \* \* \*